(12) United States Patent
Ho et al.

(10) Patent No.: US 8,138,116 B2
(45) Date of Patent: Mar. 20, 2012

(54) TITANIUM OXIDE COMPOSITION AND THE APPLICATION THEREOF ON POLY-ESTERIFICATION

(75) Inventors: Hsin-Chin Ho, Hsinchu (TW); Ching-Tsu Peng, Hsinchu (TW); Shih-Fong Lee, Hsinchu (TW); Yui-Chi Lin, Hsinchu (TW); Chun-Wei Chen, Hsinchu (TW)

(73) Assignee: Far Eastern New Century Corporation, Taipei (TW)

( * ) Notice: Subject to any disclaimer, the term of this patent is extended or adjusted under 35 U.S.C. 154(b) by 307 days.

(21) Appl. No.: 12/622,714

(22) Filed: Nov. 20, 2009

(65) Prior Publication Data

US 2011/0105715 A1 May 5, 2011

(30) Foreign Application Priority Data

Nov. 2, 2009 (CN) .......................... 2009 1 0210443

(51) Int. Cl.
| | |
|---|---|
| B01J 31/00 | (2006.01) |
| B01J 21/00 | (2006.01) |
| B01J 23/00 | (2006.01) |
| C08G 18/42 | (2006.01) |
| C08G 61/10 | (2006.01) |
| C08G 63/00 | (2006.01) |
| C08G 63/02 | (2006.01) |
| C08G 63/18 | (2006.01) |
| C08G 63/52 | (2006.01) |
| C08G 63/68 | (2006.01) |
| C08G 79/02 | (2006.01) |
| C08K 3/02 | (2006.01) |
| C08K 3/32 | (2006.01) |
| C08K 5/49 | (2006.01) |
| C08K 3/10 | (2006.01) |
| C08K 3/38 | (2006.01) |
| C08F 2/00 | (2006.01) |
| C08F 4/00 | (2006.01) |
| C08F 4/06 | (2006.01) |
| C08F 4/18 | (2006.01) |
| C08F 4/44 | (2006.01) |
| C08F 4/72 | (2006.01) |
| C08F 16/12 | (2006.01) |
| C08F 116/12 | (2006.01) |
| C08F 216/12 | (2006.01) |
| C07C 69/00 | (2006.01) |
| C07C 69/34 | (2006.01) |
| C07C 69/52 | (2006.01) |
| C07C 69/02 | (2006.01) |

(52) U.S. Cl. ........ 502/350; 502/170; 502/172; 502/236; 502/242; 560/129; 560/190; 560/205; 560/231; 526/89; 526/90; 526/101; 526/107; 526/113; 526/130; 526/333; 528/176; 528/193; 528/194; 528/279; 528/287; 528/306; 528/308.6; 524/706; 524/783

(58) Field of Classification Search .................. 502/170, 502/172, 236, 242, 350; 560/129, 190, 205, 560/231; 526/89, 90, 101, 107, 113, 130, 526/333; 528/176, 193, 194, 279, 287, 306, 528/308.6; 524/706, 783
See application file for complete search history.

(56) References Cited

U.S. PATENT DOCUMENTS

| | | | | | |
|---|---|---|---|---|---|
| 3,056,818 | A | * | 10/1962 | Werber ...................... | 554/172 |
| 4,005,048 | A | * | 1/1977 | Dowden et al. ............... | 502/202 |
| 4,161,609 | A | * | 7/1979 | Cramer ......................... | 560/215 |
| 4,547,557 | A | * | 10/1985 | McDaniel ..................... | 526/106 |
| 5,587,349 | A | * | 12/1996 | Abe et al. ...................... | 502/236 |
| 5,684,116 | A | * | 11/1997 | Martl et al. ................... | 528/176 |
| 5,703,272 | A | * | 12/1997 | Abe et al. ...................... | 560/231 |
| 6,346,070 | B1 | * | 2/2002 | Ohmatsuzawa et al. ...... | 528/279 |
| 6,559,272 | B1 | * | 5/2003 | Jeon et al. ..................... | 528/279 |
| 6,914,107 | B2 | * | 7/2005 | Duan ............................. | 526/89 |
| 7,550,552 | B2 | * | 6/2009 | Yamamoto et al. ........... | 528/271 |

FOREIGN PATENT DOCUMENTS

CN   10 1703940 A * 5/2010

* cited by examiner

*Primary Examiner* — Patricia L Hailey
(74) *Attorney, Agent, or Firm* — WPAT, PC; Justin King

(57) ABSTRACT

The application discloses a Titanium oxide composition and the application thereof. The mentioned Titanium oxide composition comprises Titanium co-precipitate(s), organic acid, diol, and water. According to this application, a catalyzed poly-esterification with said Titanium oxide composition is also disclosed. The mentioned polyesterification comprises a step of adding said Titanium oxide composition into at least one stage selected from slurry stage, esterification stage, and polycondensation stage.

14 Claims, No Drawings

TITANIUM OXIDE COMPOSITION AND THE APPLICATION THEREOF ON POLY-ESTERIFICATION

BACKGROUND OF THE INVENTION

1. Field of the Invention

The present invention is generally related to Titanium oxide composition, and more particularly to Titanium oxide composition with Titanium co-precipitate(s) and the application thereof on poly-esterification.

2. Description of the Prior Art

Polyester is wildly employed in many industrial applications. Taking polyethylene terephthalate (PET) for example, PET presents great mechanical strength, heat resistance, transparence, and gas barrier. Because of the mentioned characteristics, PET can be employed as container materials for juice, cold drinks, soft drinks, soda drinks, and so on. PET also can be used as materials of membranes, sheets, fibers, and so on. Those polyesters usually can be produced as following. Through esterification of di-carboxylic acid(s) and diol(s), such as terephthalic acid and ethylene glycol, low poly-condensation product(s) can be obtained. Subsequently, PET can be produced by employing the low poly-condensation product(s) passing through melt state polycondensation with catalyst(s), and polymerization. Recently, the catalysts mostly employed for industrial producing and studying are the serial compounds with metal element selected from Sb (antimony), Ge (germanium), and Ti (Titanium). The catalysts with Ge are helpful to produce polyester products with higher L value. But, Ge catalysts generally are more expensive. Sb catalysts will be reduced to Sb metal during the polymerization to make the L value of produced polyester product lower. Besides, Sb is poisonous, and the production cost of PET will be raised for treating the pollution caused by Sb. The better-known catalyst is Ti. Ti catalyst will not introduce heavy metal pollution during production. Solubility is a common problem of most Ti catalysts. When Ti catalyst dispersed in ethylene glycol, it will become suspension. The reaction with the Ti catalyst suspension will not be uniform, so that the quality of the product from the reaction cannot be stable.

In order to improve the mentioned problem of Ti catalyst, there were many solutions provided from different units. For example, Lurgi Zimmer Co. provides a Ti catalyst with carrier to keep Ti catalyst from aggregating. In China patent CN1403193, organic modification is employed for preventing the catalyst aggregating. In patent CN1644601, a liquid Ti catalyst is produced with a mixed solution including one or plurality solvent(s) selected from ethanol, iso-propanol, toluene, and mixed xylene. In Japanese patent public number JP 07-207010, alkali metal compounds are employed for raising the solubility of Ti catalyst. In patent CN1962723, Ti catalyst with good light stability is produced from reacting Titanium complex with phosphide, wherein the Titanium complex is from 2-hydroxy carboxylic acid reacting with titanate. In patent CN1809605, Titanium solution is obtained from aliphatic diol and polyhydric alcohol with water, or with alkaline compounds. In patent CN1630674, Titanium compound is mixed with solubility raising agent such as alkali metal compound and glycerin, or tri(hydroxylmethyl) propane to improve the solubility of Ti compound. In patent CN1328072, a high-activity catalyst contains anti-hydrolytic high-activity titanium, the acetate, carbonate or oxalate of (1~4) valence metal ions, and at least one of alkoxyl compound, organic acid and phosphorous compound. In patent CN1402653, liquid Ti catalyst can be obtained by adding titanate into complexing agent (hydroxycarboxylic acid, alkanolamines, aminocarboxylic acids, or combinations of two or more thereof), water or alcohol solvent, and hypophosphorous acid. In patent CN1583823, liquid Ti catalyst is produced from employing the mixture of alkali metal hydroxide and ethylene glycol to dissolve the mixture of Titanium oxide and silicon oxide.

The above-mentioned solutions can improve the problem of reaction un-uniform in some degree, but many impurities with the employed catalyst will be introduced into the reaction system. The mentioned impurities will decrease the product quality. Moreover, another problem of Ti catalyst is that Ti is with high catalytic activity and low thermal stability, and the produced polyester is easy to degrade to produce lots of side-products during polycondensation and moulding process. Therefore, the color of polyester product becomes bad. But if we want to decrease the side-products by adding more phosphorus thermo-stabilizer, the activity of Ti catalyst will be suppressed.

Therefore, it is important to provide a method or catalyst that can not only raise the dispersion of Ti catalyst for keeping reaction uniform, but also keep the catalyst activity for producing well quality polyester.

SUMMARY OF THE INVENTION

According to the above, the present invention provides new Titanium oxide composition and the application thereof to fulfill the requirements of this industry.

One object of the present invention is to employ proper organic acid to improve the dispersion/dissolution of Titanium oxide composition in solution.

Another object of the present invention is to provide a catalyzed poly-esterification with Titanium oxide composition, through employing a suitable Titanium oxide composition, the quality of the polyester product can be efficiently improved.

According to above-mentioned objectives, this present invention discloses Titanium oxide composition, wherein the Titanium oxide composition comprises Titanium co-precipitate(s), organic acid, diol, and water. This invention also discloses a catalyzed poly-esterification with Titanium oxide composition. The mentioned catalyzed ploy-esterification comprises one step of adding Titanium oxide composition into at least one stage selected from slurry stage, esterification stage, and polycondensation stage.

DESCRIPTION OF THE PREFERRED EMBODIMENTS

What is probed into the invention is Titanium oxide composition and the application thereof. Detail descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

One preferred embodiment of this present invention discloses a Titanium oxide composition. The mentioned Titanium oxide composition comprises Titanium co-precipitate(s), organic acid, diol, and water. Related to the total weight of the Titanium oxide composition, the weight percentage of the components is 0.01~20 wt % Titanium co-precipitate(s), 2~80 wt % organic acid, 0.1~95 wt % diol, and 0.1~99 wt % water.

According to this embodiment, the Titanium co-precipitate(s) comprises co-precipitate(s) of Titanium dioxide ($TiO_2$)/silicon dioxide ($SiO_2$), and/or co-precipitate of Titanium dioxide ($TiO_2$)/Zirconium dioxide ($ZrO_2$), wherein the mole ratio in the co-precipitate of $TiO_2/SiO_2$ is $TiO_2:SiO_2$=90:10 mol/mol to 20:80 mol/mol, wherein the mole ratio in the co-precipitate of $TiO_2/ZrO_2$ is $TiO_2:ZrO_2$=95:5 mol/mol to 70:30 mol/mol.

The mentioned organic acid is selected from formic acid, acetic acid, oxalic acid, malonic acid, succinic acid, glutaric acid, adipic acid, pimelic acid, tartaric acid, salicylic acid, citric acid, lactic acid, malic acid, cinnamic acid, caffeic acid.

The mentioned diol is selected from ethylene glycol, propylene glycol, butanediol, pentanediol.

In one preferred example of this embodiment, the Titanium oxide composition can be prepared as following. After mixing Titanium co-precipitate(s), organic acid, diol, and water to form a mixture, a uniform and transparent solution can be obtained through stirring the mixture under room temperature. In another example of this embodiment, the Titanium oxide composition can be formed by mixing Titanium co-precipitate(s), organic acid, diol, and water to form a mixture, and then heat the mixture to obtain a uniform and transparent solution. The haze of the uniform and transparent solution of Titanium oxide composition can be measured with HunterLab COLORQUEST XE by the method of ASTM D 1003.

EXAMPLE 1

Preparing the Solution Blank

Titanium compound C-94 with $TiO_2/SiO_2$ co-precipitate and/or $TiO_2/ZrO_2$ co-precipitate (commercial available from Sachtleben Chemie GmbH) 0.5 g is added into 99.5 g 50% ethylene glycol aqueous to form a mixture. The mixture is stirred at room temperature for 1 day. The haze of the solution can be measured with HunterLab COLORQUEST XE by ASTM D 1003 method. The measured haze data is 95%.

EXAMPLE 2

Preparing the Solution 1-1

Tartaric acid (39.8 g) is added into 59.7 g 50% ethylene glycol aqueous and stirred to dissolve to form a solution. Titanium compound C-94 with $TiO_2/SiO_2$ co-precipitate and/or $TiO_2/ZrO_2$ co-precipitate (commercial available from Sachtleben Chemie GmbH) 0.5 g is added into the solution to form a mixture. The mixture is stirred at room temperature for 1 day, and a uniform and transparent solution is obtained. The haze of the uniform and transparent solution can be measured with HunterLab COLORQUEST XE by ASTM D 1003 method. The measured haze data is 1.7%.

EXAMPLE 3

Preparing the Solution 1-2

Tartaric acid (19.9 g) is added into 79.6 g 50% ethylene glycol aqueous and stirred to dissolve to form a solution. Titanium compound C-94 with $TiO_2/SiO_2$ co-precipitate and/or $TiO_2/ZrO_2$ co-precipitate (commercial available from Sachtleben Chemie GmbH) 0.5 g is added into the mentioned solution to form a mixture. The mixture is stirred at room temperature for 1 day, and a uniform and transparent solution is obtained. The haze of the uniform and transparent solution can be measured with HunterLab COLORQUEST XE by ASTM D 1003 method. The measured haze data is 1.8%.

EXAMPLE 4

Preparing the Solution 1-3

Tartaric acid (5.0 g) is added into 94.5 g 50% ethylene glycol aqueous and stirred to dissolve to form a solution. Titanium compound C-94 with $TiO_2/SiO_2$ co-precipitate and/or $TiO_2/ZrO_2$ co-precipitate (commercial available from Sachtleben Chemie GmbH) 0.5 g is added into the mentioned solution to form a mixture. The mixture is stirred at room temperature for 1 day, and a uniform and transparent solution is obtained. The haze of the uniform and transparent solution can be measured with HunterLab COLORQUEST XE by ASTM D 1003 method. The measured haze data is 1.8%.

EXAMPLE 5

Preparing the Solution 2-1

After adding Salicylic acid (39.8 g) is added into 59.7 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.5%.

EXAMPLE 6

Preparing the Solution 2-2

After adding Salicylic acid (19.9 g) is added into 79.6 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.5%.

EXAMPLE 7

Preparing the Solution 2-3

After adding Salicylic acid (5.0 g) is added into 94.5 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.6%.

EXAMPLE 8

Preparing the Solution 3-1

After adding succinic acid (39.8 g) is added into 59.7 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.3%.

EXAMPLE 9

Preparing the Solution 3-2

After adding succinic acid (19.9 g) is added into 79.6 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.3%.

EXAMPLE 10

Preparing the Solution 3-3

After adding succinic acid (5 g) is added into 94.5 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.4%.

EXAMPLE 11

Preparing the Solution 4-1

After adding oxalic acid (39.8 g) is added into 59.7 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.0%.

EXAMPLE 12

Preparing the Solution 4-2

After adding oxalic acid (19.9 g) is added into 79.6 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.1%.

EXAMPLE 13

Preparing the Solution 4-3

After adding oxalic acid (5.0 g) is added into 94.5 g 50% ethylene glycol aqueous and stirred to dissolve, Titanium compound C-94 with $TiO_2/SiO_2$ co-precipitate and/or $TiO_2/ZrO_2$ co-precipitate (commercial available from Sachtleben Chemie GmbH) 0.5 g is added and stirred at room temperature for 1 day to obtain a uniform and transparent solution. The haze of the uniform and transparent solution can be measured with HunterLab COLORQUEST XE by ASTM D 1003 method. The measured haze data is 1.0%.

The results of Example 1 to Example 13 are collected as the following Table 1.

TABLE 1

|  | C-94 wt % | organic acid | 50% glycol aqueous/ organic acid (weight ratio) | Solution appearance | Haze |
|---|---|---|---|---|---|
| Blank | 0.50% | — | 100/0 | precipitate and muddy | 95% |
| 1-1 | 0.50% | tartaric acid | 60/40 | transparent and uniform | 1.7% |
| 1-2 | 0.50% | tartaric acid | 80/20 | transparent and uniform | 1.8% |
| 1-3 | 0.50% | tartaric acid | 95/5 | transparent and uniform | 1.8% |
| 2-1 | 0.50% | salicylic acid | 60/40 | transparent and uniform | 1.5% |
| 2-2 | 0.50% | salicylic acid | 80/20 | transparent and uniform | 1.5% |
| 2-3 | 0.50% | salicylic acid | 95/5 | transparent and uniform | 1.6% |
| 3-1 | 0.50% | succinic acid | 60/40 | transparent and uniform | 1.3% |
| 3-2 | 0.50% | succinic acid | 80/20 | transparent and uniform | 1.3% |
| 3-3 | 0.50% | succinic acid | 95/5 | transparent and uniform | 1.4% |
| 4-1 | 0.50% | oxalic acid | 60/40 | transparent and uniform | 1.0% |
| 4-2 | 0.50% | oxalic acid | 80/20 | transparent and uniform | 1.1% |
| 4-3 | 0.50% | oxalic acid | 95/5 | transparent and uniform | 1.0% |

Another embodiment according to this application discloses a catalyzed poly-esterification with Titanium oxide composition. The poly-esterification comprises co-poly-esterification. The mentioned catalyzed poly-esterification with Titanium oxide composition comprises one step of adding the Titanium oxide composition into the poly-esterification. In one preferred example of this embodiment, the mentioned catalyzed poly-esterification with Titanium oxide composition comprises one step of adding Titanium oxide composition into transesterification of di-carboxyl esters. In another preferred example of this embodiment, the mentioned catalyzed poly-esterification with Titanium oxide composition comprises one step of adding Titanium oxide composition into poly-esterification of di-carboxylic acid and overdosed diol.

The mentioned Titanium oxide composition comprises Titanium co-precipitate(s), organic acid, diol, and water. Related to the total weight of the Titanium oxide composition, the weight percentage of the components is as the following:

0.01~20 wt % Titanium co-precipitate(s), 2~80 wt % organic acid, 0.1~95 wt % diol, and 0.1~99 wt % water.

According to this embodiment, the Titanium co-precipitate(s) comprises co-precipitate of Titanium dioxide ($TiO_2$)/silicon dioxide ($SiO_2$), and/or co-precipitate of Titanium dioxide ($TiO_2$)/Zirconium dioxide ($ZrO_2$), wherein the mole ratio in the co-precipitate of $TiO_2/SiO_2$ is $TiO_2:SiO_2=90:10$ mol/mol to 20:80 mol/mol, wherein the mole ratio in the co-precipitate of $TiO_2/ZrO_2$ is $TiO_2:ZrO_2=95:5$ mol/mol to 70:30 mol/mol.

The mentioned organic acid is selected from formic acid, acetic acid, oxalic acid, malonic acid, succinic acid, glutaric acid, adipic acid, pimelic acid, tartaric acid, salicylic acid, citric acid, lactic acid, malic acid, cinnamic acid, caffeic acid.

The mentioned diol is selected from ethylene glycol, propylene glycol, butanediol, pentanediol.

In one preferred example of this embodiment, the Titanium oxide composition can be prepared as following. After mixing Titanium co-precipitate(s), organic acid, diol, and water to form a mixture, a uniform and transparent solution can be obtained through stirring the mixture under room temperature. In another example of this embodiment, the Titanium oxide composition can be formed by mixing Titanium co-precipitate(s), organic acid, diol, and water to form a mixture, and then heat the mixture to obtain a uniform and transparent solution.

All people skilled in the art know that different Titanium catalysts should employ different methods to approach best dispersion. According to this embodiment, organic acid is employed to keep the catalyst completely dispersed and dissolved in diol. So that the catalyst dispersion problem can be resolved to get better Lb value of polyester chip.

In one preferred example of this embodiment, the catalyzed poly-esterification with Titanium oxide composition can further comprise adding phosphide into the transesterification of di-carboxyl esters, or into the condensation of di-carboxylic acid and overdosed diol. The phosphide plays as thermo-stabilizer in those reactions. The phosphide is selected from phosphoric acid, phosphorous acid, trimethyl phosphate, triethyl phosphate, tripropyl phosphate, triphenyl phosphate, triisopropyl phosphate, tributyl phosphate, benzyl phosphate ester, alkyl benzyl phosphate, aromatic phosphate ester, dimethyl phosphate, diethyl phosphate, dipropyl phosphate, diisopropyl phosphate, dibutyl phosphate, diphenyl phosphate, or the salts thereof. Preferably, phosphide is selected from phosphoric acid, triethyl phosphate, trimethyl phosphate. The used amount of phosphide in the poly-esterification is about to 1~30 ppm (phosphorous atom relative to polyester). According to this example, the poly-esterification can employ only one phosphide, or employ more than one phosphide.

In another preferred example of this embodiment, the catalyzed poly-esterification with Titanium oxide composition can further comprise adding co-catalyst(s) into the transesterification of di-carboxyl esters, or adding co-catalyst(s) into the polycondensation of di-carboxylic acid and overdosed diol. The co-catalyst(s) can be employed to raising the activity of the Titanium oxide composition. The mentioned co-catalyst(s) is metal compound selected from metal acetates, carbonates, nitrates, chlorides, sulfates, nitrates, or metal oxide, wherein the metal is selected from Mn, Zn, Co, Mg, Al, Ca, Ge, Fe, Ga, Cu, Ni, Sn. According to this example, all the metal atom is counted preferably less than 50 ppm, more preferably less than 30 ppm.

In another preferred example of this embodiment, the mentioned catalyzed poly-esterification with Titanium oxide composition can be employed to prepare thermoplastic polymer. The thermoplastic polymer comprises polyester consisted of repeat unit A, comprising di-carboxylic acid derivatives, and at least one repeat unit B, comprising diol derivatives. The mentioned di-carboxylic acid can be selected form C2~C16 aliphatic dicarboxylic acid, C8~C16 aromatic dicarboxylic acid, or the combination thereof. Selectively, in one preferred example, the C8~C16 aromatic dicarboxylic acid is p-Phthalic acid. Preferably, the thermoplastic polymer is Poly-ethylene terephthalate (PET), or co-polyester of PET. More preferably, in the mentioned thermoplastic polymer, based on the total mole ratio of the di-carboxylic acid component, p-Phthalic acid is at least 60 mol % to the di-carboxylic acid. And, based on the total mole ratio of the diol component, ethylene glycol is at least 60 mol % to the diol.

According to this example, selectively, the mentioned dicarboxylic acid component comprises two C8~C16 aromatic dicarboxylic acids. In one preferred case of this example, the mentioned two C8~C16 aromatic dicarboxylic acids are p-Phthalic acid and m-Phthalic acid. More preferably, the mentioned di-carboxylic acid component includes 96~99 mol % p-Phthalic acid, and 4~1 mol % m-Phthalic acid.

According to this example, selectively, the diol component comprises at least one C2~C10 diol. Preferably, the diol component comprises at least one C2~C5 diol. When the diol component is ethylene glycol, during polymerizing process, dehydration will happen on part of ethylene glycol, and DEG (di-ethylene glycol) is formed. So that the repeat unit B formed from DEG will exist in the co-polyester in the polymer product. Preferably, in that polyester, based on the total mole of the repeat unit B, the repeat unit B derived from ethylene glycol is 95~99 mol %, and the repeat unit B derived from di-ethylene glycol is 5~1 mol %.

The following will take polyester manufacture as one example to express this embodiment, wherein the polyester is produced from polycondensation of aromatic di-carboxylic acid, or the corresponding ester thereof, and aliphatic diol, or the corresponding ester. However, this application should not be limited by this example. The scope of the present invention is expressly not limited except as specified in the accompanying claims.

Production of Polyester:

Esterification Stage:

First of all, when producing polyester, aromatic di-carboxylic acid/or the corresponding ester thereof is mixed with aliphatic diol/or the corresponding ester thereof to form a solution, and the mentioned solution is provided into the esterification stage continuously. Through the esterification stage, a low-polycondensation product from esterification of aromatic di-carboxylic acid and aliphatic diol is obtained. The average molecular weight of the low-polycondensation product is about 500~5000. Subsequently, the low-polycondensation product is provided to liquid polycondensation stage.

Liquid Polycondensation Stage:

In liquid polycondensation stage, the low-polycondensation product from the esterification stage is processed polycondensation under vacuum at the temperature higher than the melting point of the polyester, usually about 250~280° C. During the polycondensation, the non-reacted aliphatic diol is expected to be removed, so that the mentioned polycondensation can be processed. Through the liquid polycondensation stage, the liquid polycondensation ester is obtained, wherein the inherent viscosity IV of the liquid polycondensation ester is about 0.4~0.8 dl/g. The liquid polycondensation ester is then cut into chip.

According to this embodiment, it is enough for processing the production that the Titanium oxide composition and other additives, depending upon the necessity, exist in the polycondensation, wherein the additives comprise co-catalyst with metal compound, thermal stabilizer with phosphide. Therefore, the Titanium oxide composition and the additives can be added into any one stage selected from slurry stage, esterification stage, and liquid polycondensation stage. According to this embodiment, the amount of the mentioned Titanium oxide composition and the additives can be added into one of the stages in once. The amount of the mentioned Titanium oxide composition and the additives also can be divided into several parts to be added into one of the stages in a plurality of times. The amount of the mentioned Titanium oxide composition and the additives also can be divided into several parts to be added into different stages.

Solid Polycondensation Stage:

Before into the solid poly-condensation stage, the liquid poly-condensation ester has to be heated to the temperature lower than the solid polymerization temperature for processing pre-crystallization. The solid poly-condensation can be proceeded under nitrogen at 190~240° C. Through solid poly-condensation stage, solid poly-condensation ester is obtained with inherent viscosity IV about 0.4~1.5 dl/g.

According to this embodiment, the mentioned esterification stage and the poly-condensation stage can be proceeded in batch, semi-continuous, or continuous process. The polyester according to this embodiment can be employed as the materials in many styles, such as film, fiber, hollow container (like bottle, etc.), and other products consisted of polyester as known by the skills in the art.

EXAMPLE 14

Comparative Example 1 (Titanium Powder)

38.1 Kg terephthalic acid (p-Phthalic acid; TPA), 0.81 Kg iso-Phthalic acid (m-Phthalic acid; IPA), and 18.16 Kg ethylene glycol (EG) are added into a tank and stirred to a slurry. The slurry is poured into esterification tank, and the temperature is raised to about 255° C. to perform esterification for about 6.5 hours. When the esterification ratio is larger than 95%, an ester product is obtained. The ester product is transferred to a polymerization tank, and then 30 ppm (Titanium atom to PET) solution blank of Example 1, 35 ppm phosphoric acid as thermal stabilizer, and 35 ppm Cobalt Acetate as toner are added into the polymerization tank. The poly-condensation reaction is performed at about 280° C. under 1 Torr until the inherent viscosity of the mixture in the polymerization is about 0.6 dl/g. After proceeding cutting, liquid polyester pellets are obtained. Subsequently, the liquid polyester pellets are transferred to a solid polymerization tank, the liquid polyester pellets are proceeded pre-recrystallization at 150° C. Then, the pre-recrystallization product is heated for 4 hours at 235° C. under 2 Torr to produce solid poly-condensation pellets of polyethylene terephthalate. Some physical properties of the mentioned pellets are shown in Table 2.

EXAMPLE 15

Tartaric Acid 38.1 Kg terephthalic acid (p-Phthalic acid; TPA), 0.81 Kg iso-Phthalic acid (m-Phthalic acid; IPA), and 18.16 Kg ethylene glycol (EG) are added into a tank and stirred to a slurry. The slurry is poured into esterification tank, and the temperature is raised to about 255° C. to perform esterification for about 6.5 hours. When the esterification ratio is larger than 95%, an ester product is obtained. The ester product is transferred to a polymerization tank, and then 30 ppm (Titanium atom to PET) solution 1-3 according to Example 4, 35 ppm phosphoric acid as thermal stabilizer, and 35 ppm Cobalt Acetate as toner are added into the polymerization tank. The poly-condensation reaction is performed at about 280° C. under 1 Torr until the inherent viscosity of the mixture in the polymerization is about 0.6 dl/g. After proceeding cutting, liquid polyester pellets are obtained. Subsequently, the liquid polyester pellets are transferred to a solid polymerization tank, the liquid polyester pellets are proceeded pre-recrystallization at 150° C. Then, the pre-recrystallization product is heated for 4 hours at 235° C. under 2 Torr to produce solid poly-condensation pellets of polyethylene terephthalate. Some physical properties of the mentioned pellets are shown in Table 2.

EXAMPLE 16

Succinic Acid 38.1 Kg terephthalic acid (p-Phthalic acid; TPA), 0.81 Kg iso-Phthalic acid (m-Phthalic acid; IPA), and 18.16 Kg ethylene glycol (EG) are added into a tank and stirred to a slurry. The slurry is poured into esterification tank, and the temperature is raised to about 255° C. to perform esterification for about 6.5 hours. When the esterification ratio is larger than 95%, an ester product is obtained. The ester product is transferred to a polymerization tank, and then 30 ppm (Titanium atom to PET) solution 2-3 according to Example 7, 35 ppm phosphoric acid as thermal stabilizer, and 35 ppm Cobalt Acetate as toner are added into the polymerization tank. The poly-condensation reaction is performed at about 280° C. under 1 Torr until the inherent viscosity of the mixture in the polymerization is about 0.6 dl/g. After proceeding cutting, liquid polyester pellets are obtained. Subsequently, the liquid polyester pellets are transferred to a solid polymerization tank, the liquid polyester pellets are proceeded pre-recrystallization at 150° C. Then, the pre-recrystallization product is heated for 4 hours at 235° C. under 2 Torr to produce solid poly-condensation pellets of polyethylene terephthalate. Some physical properties of the mentioned pellets are shown in Table 2.

EXAMPLE 17

Salicylic Acid 38.1 Kg terephthalic acid (p-Phthalic acid; TPA), 0.81 Kg iso-Phthalic acid (m-Phthalic acid; IPA), and 18.16 Kg ethylene glycol (EG) are added into a tank and stirred to a slurry. The slurry is poured into esterification tank, and the temperature is raised to about 255° C. to perform esterification for about 6.5 hours. When the esterification ratio is larger than 95%, an ester product is obtained. The ester product is transferred to a polymerization tank, and then 30 ppm (Titanium atom to PET) solution 3-3 according to Example 10, 35 ppm phosphoric acid as thermal stabilizer, and 35 ppm Cobalt Acetate as toner are added into the polymerization tank. The poly-condensation reaction is performed at about 280° C. under 1 Torr until the inherent viscosity of the mixture in the polymerization is about 0.6 dl/g. After proceeding cutting, liquid polyester pellets are obtained. Subsequently, the liquid polyester pellets are transferred to a solid polymerization tank, the liquid polyester pellets are proceeded pre-recrystallization at 150° C. Then, the pre-recrystallization product is heated for 4 hours at 235° C. under 2 Torr to produce solid poly-condensation pellets of polyethylene terephthalate. Some physical properties of the mentioned pellets are shown in Table 2.

EXAMPLE 18

Oxalic Acid 38.1 Kg terephthalic acid (p-Phthalic acid; TPA), 0.81 Kg iso-Phthalic acid (m-Phthalic acid; IPA), and 18.16 Kg ethylene glycol (EG) are added into a tank and stirred to a slurry. The slurry is poured into esterification tank, and the temperature is raised to about 255° C. to perform esterification for about 6.5 hours. When the esterification ratio is larger than 95%, an ester product is obtained. The ester product is transferred to a polymerization tank, and then 30 ppm (Titanium atom to PET) solution 4-3 according to Example 13, 35 ppm phosphoric acid as thermal stabilizer, and 35 ppm Cobalt Acetate as toner are added into the polymerization tank. The poly-condensation reaction is performed at about 280° C. under 1 Torr until the inherent viscosity of the mixture in the polymerization is about 0.6 dl/g. After proceeding cutting, liquid polyester pellets are obtained. Subsequently, the liquid polyester pellets are transferred to a solid polymerization tank, the liquid polyester pellets are proceeded pre-recrystallization at 150° C. Then, the pre-recrystallization product is heated for 4 hours at 235° C. under 2 Torr to produce solid poly-condensation pellets of polyethylene terephthalate. Some physical properties of the mentioned pellets are shown in Table 2.

TABLE 2

|  | IV-MSP | IV-SSP | L | La | Lb |
|---|---|---|---|---|---|
| Example 14 | 0.589 | 0.721 | 85.7 | −1.5 | 6.5 |
| Example 15 | 0.592 | 0.738 | 85.7 | −1.4 | 3.8 |
| Example 16 | 0.597 | 0.739 | 86.3 | −1.2 | 4.3 |
| Example 17 | 0.601 | 0.743 | 85.3 | −1.5 | 4.2 |
| Example 18 | 0.591 | 0.740 | 86.2 | −1.3 | 4.7 |

* IV-MSP: intrinsic viscosity of melt state polymerization pellet
* IV-SSP: intrinsic viscosity of solid state polymerization pellet
* the values of IV are measured with the Ubbelohde viscometer tube according to ASTM D 4603
* the values of L, Lb, La are measured with the device of Nippon Denshoku ZE2000 according to ASTM D 1925. The larger L value means that the brightness of the sample is higher. a > 0 means the color of the sample tends to red; a < 0 means the color of the sample tends to green; b > 0 means the color of the sample tends to yellow; b < 0 means the color of the sample tends to blue.
* Haze: detected with the device of HunterLab COLORQUEST XE according to ASTM D 1003 standard To sum up, this present application discloses a Titanium oxide composition and the application on polyesterification/co-polyesterification. The Titanium oxide composition comprises Titanium co-precipitate(s), organic acid, diol, and water. The mentioned Titanium co-precipitate(s) comprises co-precipitate(s) of Titanium dioxide ($TiO_2$)/silicon dioxide ($SiO_2$), and/or co-precipitate of Titanium dioxide ($TiO_2$)/Zirconium dioxide ($ZrO_2$). When the Titanium oxide composition is employed in the catalyst for polyesterification/co-polyesterification, the titanium catalyst can be completely dissolved/dispersed into diol by using proper organic acid, so that the quality of the polyester product can be improved. The Titanium oxide composition can be added into at least one stage selected from Slurry stage, esterification stage, and poly-condensation stage. Moreover, the Titanium oxide composition can be added into one of the mentioned stages in once, or in several times. The amount of the Titanium oxide composition also can be divided into several parts and then added into a plurality of stages in several times.

Obviously many modifications and variations are possible in description of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A Titanium oxide composition comprising:
   Titanium co-precipitate(s), wherein the weight percentage of the Titanium co-precipitate(s) is 0.01~20 wt %, wherein the Titanium co-precipitate(s) comprises co-precipitate(s) of Titanium dioxide ($TiO_2$)/silicon dioxide ($SiO_2$), and/or co-precipitate of Titanium dioxide ($TiO_2$)/Zirconium dioxide ($ZrO_2$);
   organic acid, wherein the weight percentage of the organic acid is 2~80 wt %;
   diol, wherein the weight percentage of the diol is 0.1~95 wt %; and
   water, wherein the weight percentage of the water is 0.1~99 wt %.

2. The Titanium oxide composition according to claim 1, wherein the mole ratio in the Titanium co-precipitate(s) of $TiO_2/SiO_2$ is $TiO_2$: $SiO_2$=90:10 mol/mol to 20:80 mol/mol, wherein the mole ratio in the Titanium co-precipitate(s) of $TiO_2/ZrO_2$ is $TiO_2$:$ZrO_2$=95:5 mol/mol to 70:30 mol/mol.

3. The Titanium oxide composition according to claim 1, wherein said organic acid is selected from formic acid, acetic acid, oxalic acid, malonic acid, succinic acid, glutaric acid, adipic acid, pimelic acid, tartaric acid, salicylic acid, citric acid, lactic acid, malic acid, cinnamic acid, caffeic acid.

4. The Titanium oxide composition according to claim 1, wherein said diol is selected from ethylene glycol, propylene glycol, butanediol, pentanediol.

5. A catalyzed polyesterification with Titanium oxide composition comprising: adding a Titanium oxide composition into a polyesterification of di-carboxylic acid and diol, wherein the Titanium oxide composition comprises:
   Titanium co-precipitate(s), wherein the weight percentage of the Titanium co-precipitate(s) is 0.01~20 wt %, wherein the Titanium co-precipitate(s) comprises co-precipitate(s) of Titanium dioxide ($TiO_2$)/silicon dioxide ($SiO_2$), and/or co-precipitate of Titanium dioxide ($TiO_2$)/Zirconium dioxide ($ZrO_2$);
   organic acid, wherein the weight percentage of the organic acid is 2~80 wt %;
   diol, wherein the weight percentage of the diol is 0.1~95 wt %; and
   water, wherein the weight percentage of the water is 0.1~99 wt %.

6. The catalyzed polyesterification with Titanium oxide composition according to claim 5, wherein said dicarboxylic acid is selected from C2~C16 aliphatic dicarboxylic acid, C8~C16 aromatic dicarboxylic acid, or the combination thereof.

7. The catalyzed polyesterification with Titanium oxide composition according to claim 5, wherein said diol subjected to said polyesterification comprises at least one C2~C10 diol.

8. The catalyzed polyesterification with Titanium oxide composition according to claim 5, wherein said Titanium oxide composition is added into at least one stage selected from Slurry stage, esterification stage, and poly-condensation stage of said polyesterification.

9. The catalyzed polyesterification with Titanium oxide composition according to claim 5, wherein the mole ratio in the Titanium co-precipitate(s) of $TiO_2/SiO_2$ is $TiO_2:SiO_2$=90:10 mol/mol to 20:80 mol/mol, wherein the mole ratio in the Titanium co-precipitate(s) of $TiO_2/ZrO_2$ is $TiO_2:ZrO_2$=95:5 mol/mol to 70:30 mol/mol.

10. The catalyzed polyesterification with Titanium oxide composition according to claim 5, wherein said organic acid is selected from formic acid, acetic acid, oxalic acid, malonic acid, succinic acid, glutaric acid, adipic acid, pimelic acid, tartaric acid, salicylic acid, citric acid, lactic acid, malic acid, cinnamic acid, caffeic acid.

11. The catalyzed polyesterification with Titanium oxide composition according to claim 5, wherein said diol present in said Titanium oxide composition is selected from ethylene glycol, propylene glycol, butanediol, pentanediol.

12. The catalyzed polyesterification with Titanium oxide composition according to claim 5, further comprising adding additives into said polyesterification.

13. The catalyzed polyesterification with Titanium oxide composition according to claim 12, wherein said additives comprises a thermal stabilizer reagent with phosphide.

14. The catalyzed polyesterification with Titanium oxide composition according to claim 12, wherein said additives comprises a co-catalyst with metal compound.

* * * * *